(12) United States Patent
Hashino et al.

(10) Patent No.: US 7,796,003 B2
(45) Date of Patent: Sep. 14, 2010

(54) MULTI-PARALLEL MAGNETIC-FIELD CANCELLATION TYPE TRANSFORMER

(75) Inventors: Satoshi Hashino, Saitama (JP); Masao Nagano, Saitama (JP); Mitsuaki Hirakawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/320,106

(22) Filed: Jan. 16, 2009

(65) Prior Publication Data

US 2009/0180305 A1 Jul. 16, 2009

(30) Foreign Application Priority Data

Jan. 16, 2008 (JP) .............................. 2008-006438

(51) Int. Cl.
*H01F 30/12* (2006.01)
*H01F 27/24* (2006.01)
*H01F 17/04* (2006.01)

(52) U.S. Cl. ............................ 336/5; 336/12; 336/212

(58) Field of Classification Search ....................... None
See application file for complete search history.

(56) References Cited

U.S. PATENT DOCUMENTS 3,657,678 A * 4/1972 Schwenden ................. 336/160
4,213,084 A * 7/1980 Hiromitsu ................... 323/250
2003/0206087 A1* 11/2003 Raff ........................... 336/182
2004/0114397 A1 6/2004 Liu et al.
2004/0239463 A1* 12/2004 Poniatowski et al. .......... 336/10
2005/0030140 A1* 2/2005 Dahlgren et al. ............... 336/5

FOREIGN PATENT DOCUMENTS

EP      1 835 604 A1   9/2007
JP    2006-149054 A    6/2006

OTHER PUBLICATIONS

European Search Report, 44825P EP, dated Mar. 17, 2009.

* cited by examiner

*Primary Examiner*—Anh T Mai
(74) *Attorney, Agent, or Firm*—Squire, Sanders & Dempsey LLP (57) ABSTRACT

A multi-parallel magnetic-filed cancellation type transformer includes a plurality of coils which generate magnetic flux during energization and a core having a plurality of magnetic leg portions on which the coils are wound, and bases for fixing the magnetic leg portions. The plurality of coils are wound on the magnetic leg portions in such a manner that the magnetic flux generated from the coils are formed in the directions opposite to each other. A plurality of closed magnetic circuits of the magnetic flux are formed at the magnetic leg portions and the bases. The magnetic resistance of the closed magnetic circuits is homogeneous. Accordingly, the transformer can reduce the size thereof, and prevent the deterioration of electric power conversion efficiency.

9 Claims, 9 Drawing Sheets

MULTI-PARALLEL MAGNETIC-FIELD CANCELLATION TYPE TRANSFORMER

CROSS-REFERENCE TO RELATED APPLICATION(S)

This application claims the foreign priority benefit under Title 35, United States Code, §119 (V1)-(d), of Japanese Patent Application No. 2008-006438A, filed on Jan. 16, 2008 in the Japan Patent Office, the disclosure of which is herein incorporated by reference in its entirety.

BACKGROUND OF THE INVENTION

1. Field of the Invention

The present invention relates to a multi-parallel magnetic-field cancellation type transformer for converting a voltage and an electric power conversion circuit including the transformer.

2. Description of the Related Art

Heretofore, there is known an electric power conversion circuit, a so-called DC-DC converter, which converts electric power by stepping up/down an input voltage (for example, JP2006-149054A discloses the DC-DC converter).

The conventional DC-DC converter disclosed in JP2006-149054A includes a transformer in which a primary coil and a secondary coil are connected to each other, and an inductor applied for varying a step-up/down rate and disposed between the transformer and an input-output terminal to which a voltage is applied. The conventional DC-DC converter can successively step up/down the voltage and reduce the size of the inductor, which leads to the downsized DC-DC converter.

However, according to the conventional DC-DC converter, if the step-up/down rate is equal to or greater than two times, the simultaneous ON state of a plurality of switching elements connected to the coils of the transformer causes a ripple current to increase. The ripple current is a pulsation component to be superimposed on a direct current flowing through the inductor applied for varying the step-up/down rate. Accordingly, the conventional DC-DC converter cannot smooth out the pulsation (variation) of the ripple current without increasing the body dimension (size) of a capacitor or an inductor. Therefore, it is difficult to reduce the size of such passive elements as capacitors and inductors and reduce the size of the DC-DC converter disclosed in JP2006-149054.

Further, according to the conventional DC-DC converter, when the step-up/down rate is equal to or greater than two times, an increase of the ripple current leads to the deterioration of electric power conversion efficiency.

SUMMARY OF THE INVENTION

An aspect of the present invention provides a multi-parallel magnetic-filed cancellation type transformer and an electric power conversion circuit including the transformer, which can reduce the size of the transformer and prevent the deterioration of the electric power conversion efficiency.

A multi-parallel magnetic-filed cancellation type transformer comprises: a plurality of coils, each of which generates magnetic flux when energized; and a core which includes a plurality of magnetic leg portions about which the coils are wound, and a base for fixing the plurality of magnetic leg portions, wherein the direction of the magnetic flux generated from the plurality of coils are opposite to each other in any couple selected from among the pieces of magnetic flux, so that the magnetic flux is cancelled out with each other, and wherein a plurality of closed magnetic circuits of the magnetic flux are formed in the magnetic leg portions and the bases, and a magnetic resistance of at least the smallest closed magnetic circuit from among the plurality of closed magnetic circuits is homogeneous.

According to the multi-parallel magnetic-filed cancellation type transformer, the amount of magnetic flux which constitutes a closed magnetic circuit is homogeneous, so that the transformers can cancel out the direct current magnetic flux generated from each coil at the electric power conversion. Accordingly, if the number of the coils disposed in parallel increases, the transformers can prevent the magnetic saturation of the core, and reduce the size thereof and a core loss.

According to the multi-parallel magnetic-filed cancellation type transformer, wherein the plurality of coils which generate the closed magnetic circuits are connected in parallel with each other.

According to the multi-parallel magnetic-filed cancellation type transformer, the plurality of coils are connected in parallel, so that the amount of current flowing through the coils can be reduced. Accordingly, since the thickness of the coils is reduced, the transformer can improve the latitude of design of the coils and enhance space efficiency.

According to the multi-parallel magnetic-filed cancellation type transformer, wherein the magnetic path length of the closed magnetic circuits is homogeneous.

The multi-parallel magnetic-filed cancellation type transformer is constructed to equalize the magnetic path length in order to obtain the homogeneous magnetic resistance of the closed magnetic circuits, whereby balancing the magnetic flux density distribution and preventing the magnetic saturation. In this case, the magnetic resistance Rm is calculated as follows; $Rm = 1/\mu \cdot L/A$ (magnetic permeability: $\mu$, magnetic path length: L, cross section of magnetic path: A). If the product of the magnetic permeability and the cross section of magnetic path is constant in the formula described above, the homogeneous magnetic resistance can be obtained in accordance with the equal magnetic path length.

According to the multi-parallel magnetic-filed cancellation type transformer, wherein the base of the core is formed in a flat circular shape, and the magnetic leg portions of the core are extended from the center of the base to the circumference and disposed at regular intervals on the circumference.

According to the multi-parallel magnetic-filed cancellation type transformer, the magnetic leg portions are formed at regular intervals on the circumference of the base, whereby equalizing the magnetic path length of each closed magnetic circuit and obtaining the homogeneous magnetic resistance. Accordingly, the transformer can prevent the imbalance of the magnetic flux density distribution and the magnetic saturation.

According to the multi-parallel magnetic-filed cancellation type transformer, the base of the core is formed in a regular polygonal shape, and the magnetic leg portions of the core are extended from the center of the core to the sides and disposed at regular intervals on the sides.

According to the multi-parallel magnetic-filed cancellation type transformer, the magnetic leg portions are formed at regular intervals on the sides of the base, whereby equalizing the magnetic path length of each closed magnetic circuit and obtaining the homogeneous magnetic resistance. Accordingly, the transformer can prevent the imbalance of the magnetic flux density distribution and the magnetic saturation.

According to the multi-parallel magnetic-filed cancellation type transformer, two bases of the core are formed in a flat circular shape or a regular triangle and disposed in parallel with each other, and the plurality of magnetic leg portions of the core are formed in a cylindrical shape and disposed vertically to the two bases and at regular intervals apart.

According to the multi-parallel magnetic-filed cancellation type transformer, the two bases are respectively formed on a plane and disposed in parallel with each other, and the plurality of magnetic leg portions are formed in a cylindrical shape and disposed vertically to the two bases, whereby equalizing the magnetic path length of each closed magnetic circuit and obtaining the homogeneous magnetic resistance. Accordingly, the transformer can prevent the imbalance of the magnetic flux density distribution and the magnetic saturation.

According to the multi-parallel magnetic-filed cancellation type transformer, two bases of the core are respectively formed on a plane and disposed in parallel with each other, and a plurality of magnetic leg portions of the core are formed in a cylindrical shape and disposed vertically to the planes and at regular intervals apart. Further, on one plane, the base is constituted by only a part where one ends of the magnetic leg portions are mutually joined, and on the other plane, the base is constituted by only a part where the other ends of the magnetic leg portions are mutually joined.

According to the multi-parallel magnetic-filed cancellation type transformer, the two bases of the core are respectively formed on the planes and disposed in parallel, and a plurality of magnetic leg portions of the core are formed in the cylindrical shape and disposed vertically to the planes and at regular intervals apart, whereby equalizing the magnetic path length of each closed magnetic circuit and obtaining the homogeneous magnetic resistance. Accordingly, the transformer can prevent the imbalance of the magnetic flux density distribution and the magnetic saturation. Further, according to the transformer of multi-parallel magnetic-filed cancellation type, on one plane, the base is constituted of only a part where one ends of the magnetic leg portions are mutually joined, and on the other plane, the base is constituted of only a part where the other ends of the magnetic leg portions are mutually joined, whereby providing a lightweight core, compared with a base having a flat plane.

A multi-parallel magnetic-filed cancellation type transformer comprises: a plurality of coils, each of which generates magnetic flux when energized; and a core which includes three magnetic leg portions about which the coils are wound, and a base for fixing the three magnetic leg portions, wherein the three magnetic leg portions are disposed at regular intervals in one direction, and the direction of the magnetic flux generated from the plurality of coils wound on the three magnetic leg portions are opposite to each other in any couple selected from among the pieces of magnetic flux, so that the magnetic flux is cancelled out with each other, and there is a gap in the magnetic leg portion disposed at the center between the three magnetic leg portions, and wherein a plurality of closed magnetic circuits of the magnetic flux are formed in the magnetic leg portions and the base, and a magnetic resistance of at least the smallest closed magnetic circuit from among the plurality of closed magnetic circuits is homogeneous.

According to the multi-parallel magnetic-filed cancellation type transformer, the direction of the magnetic flux generated from the plurality of coils wound on the three magnetic leg portions are opposite to each other in any couple selected from among the pieces of magnetic flux, so that the magnetic flux is cancelled out with each other. Further, the gap at the magnetic leg portion formed at the center between the three magnetic leg portions is provided in order to equalize magnetic resistance generated at the three magnetic leg portions and the base which fixes the three magnetic leg portions. Accordingly, the transformer can adjust the amount of magnetic flux which constitutes a closed magnetic circuit, so that the transformer can cancel out the direct current magnetic flux generated from each coil at the electric power conversion. Consequently, the transformer can prevent the imbalance of the magnetic flux density distribution and the magnetic saturation.

An electric power conversion circuit which converts an electric power by transforming an input voltage and includes a first input-output connecting terminal and a second input-output terminal comprises: a multi-parallel magnetic-filed cancellation type transformer; an inductor whose one end is connected to a positive electrode of the first input-output connecting terminal, and whose other end is connected to a common terminal connecting to the plurality of coils of the multi-parallel magnetic-filed cancellation type transformer; a plurality of first energization control elements whose one ends are connected to the plurality of coils respectively, and whose other ends are connected to a negative electrode of the first input-output connecting terminal; and a plurality of second energization control elements whose one ends are connected to the plurality of coils respectively, and whose other ends are connected to a positive electrode of the second input-output connecting terminal.

According to the electric power conversion circuit, the first and second energization control elements can control the timing for energizing the inductor and the multi-parallel magnetic-field cancellation type transformer and a current flow in the circuit, and the multi-parallel magnetic-field cancellation type transformer can transform a voltage (step up/down a voltage) and convert electric power.

An electric power conversion circuit which converts an electric power by transforming an input voltage and includes a first input-output connecting terminal and a second input-output terminal, the electric power conversion circuit comprises: a multi-parallel magnetic-filed cancellation type transformer; a plurality of first energization control elements whose one ends are connected to the plurality of coils respectively, and whose other ends are connected to a negative electrode of the first input-output connecting terminal; and a plurality of second energization control elements whose one ends are connected to the plurality of coils respectively, and whose other ends are connected to a positive electrode of the second input-output connecting terminal. According to the electric power conversion circuit, wherein the multi-parallel magnetic-filed cancellation type transformer further comprises: a plurality of coils, each of which generates magnetic flux when energized; and a core including three magnetic leg portions about which the coils are wound, and a base for fixing the three magnetic leg portions, wherein the three magnetic leg portions are disposed at regular intervals in one direction, and the direction of the magnetic flux generated from the plurality of coils wound on the three magnetic leg portions is opposite to each other in any couple selected from among the pieces of magnetic flux, so that the magnetic flux is cancelled out with each other, and there is a gap at the magnetic leg portion formed at the center between the three magnetic leg portions, and wherein a plurality of closed magnetic circuits of the magnetic flux are formed in the magnetic leg portions and the bases, and a magnetic resistance of at least a smallest closed magnetic circuit from among the plurality of closed magnetic circuits is homogeneous.

According to the electric power conversion circuit, the first and second energization control elements can control the timing for energizing the inductor and the multi-parallel magnetic-field cancellation type transformer and a current flow in the circuit, and the multi-parallel magnetic-field cancellation type transformer can transform a voltage (step up/down a voltage) and convert electric power.

The electric power conversion circuit further comprises an inductor whose one end is connected to a positive electrode of the first input-output connecting terminal, and whose other end is connected to a common terminal connecting to the plurality of coils of the multi-parallel magnetic-filed cancellation type transformer.

According to the electric power conversion circuit, the inductor can reduce the ripple component of the input current generated when the circuit is energized, so that the size of input-output capacitors can be reduced and the electric power conversion efficiency can be improved by reducing the power loss of switching elements. Further, the electric power conversion circuit can prevent a sharp increase of the current flowing through the coils even if the multi-parallel magnetic-field cancellation type transformer is magnetically saturated due to a temperature variation.

According to the electric power conversion circuit, the first energization control elements are a switching element, and the second energization control elements are a rectifying element.

Accordingly, the electric power conversion circuit can step up an applied voltage.

According to the electric power conversion circuit, the first energization control elements are a rectifying element, and the second energization control elements are a switching element.

Accordingly, the electric power conversion circuit can step down an applied voltage.

According to the electric power conversion circuit, the first energization control elements and the second energization control elements are a switching element.

Accordingly, the electric power conversion circuit can step up/down an applied voltage.

According to the electric power conversion circuit, the switching element is constituted by an IGBT.

Accordingly, the switching element constituted of the IGBT withstands a high voltage, so that the switching element can be provided in order to control an automobile electric motor where a large amount of current is applied.

According to the electric power conversion circuit, the switching element is constituted by a MOS-FET.

Accordingly, the switching element constituted by the MOS-FET can reduce the power loss of switching, so that the electric power conversion circuit can improve the electric power conversion efficiency even if the circuit is applied in a high frequency band.

According to the electric power conversion circuit, the switching element includes a flywheel diode.

Accordingly, the switching element including the flywheel diode can prevent damage to the electric power conversion circuit by providing a path of the current when an inductor is turned off. Accordingly, the electric power conversion circuit allows the current to flow in both directions.

Accordingly, if the coils disposed in parallel increase in number, the transformers of the present invention can prevent magnetic saturation of the core and reduce the size thereof and a core loss. Consequently, the electric power conversion circuit can reduce the size thereof and improve the electric power conversion efficiency.

Further, the transformers of the present invention can reduce the current flowing through each coil, and prevent the core loss generated in the core and the deterioration of electric power conversion efficiency.

DETAILED DESCRIPTION OF THE PREFERRED EMBODIMENTS

Figure 1A:
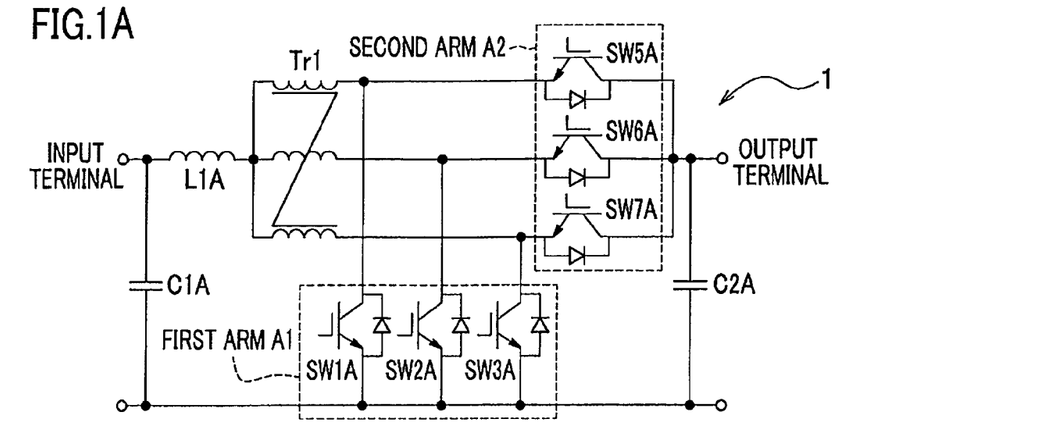
FIGS. 1A and 1B are circuit diagrams of an electric power conversion circuit of an embodiment of the present invention.
Figure 1B:
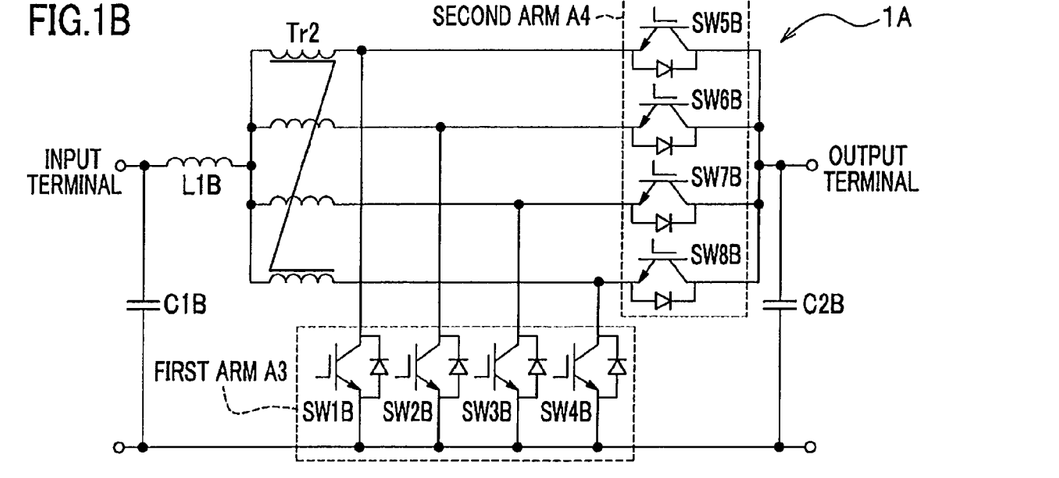

Next, embodiments of the present invention will be described with reference to drawings in detail. FIGS. 1A and 1B are a circuit diagram of an electric power conversion circuit. The electric power conversion circuit of FIG. 1A includes a three-parallel magnetic-field cancellation type transformer. The electric power conversion circuit of FIG. 1B includes a four-parallel magnetic-field cancellation type transformer. An electric power conversion circuit of FIG. 1C includes a conventional two-parallel magnetic-field cancellation type transformer. Hereinafter, the operation of the electric power conversion circuit of the present invention will be described, compared with the operation of the conventional electric power conversion circuit whose description is schematically shown.

FIG. 1A shows an electric power conversion circuit 1, wherein, in voltage step-up operation, a voltage applied to an input terminal (first input/output connecting terminal) is stepped up and supplied to an output terminal (second input/output connecting terminal), and in voltage step-down operation, a voltage applied to an input terminal (second input/output connecting terminal) is stepped down and supplied to an output terminal (first input/output connecting terminal). Namely, the electric power is converted in both ways. The electric power conversion circuit 1 includes a reactor L1A (inductor), capacitors C1A and C2A, a transformer Tr1 (multi-parallel magnetic-field cancellation type transformer), a first arm A1 constituted by a plurality of first energizing control elements, more specifically, a plurality of switching elements for switching, which are used in the voltage step-up operation of the embodiment, and a second arm A2 constituted by a plurality of second energizing control elements, more specifically, a plurality of switching elements for switching, which are used in the voltage step-down operation of the embodiment. When the voltage is stepped up or down only in one direction, energizing control elements can be replaced with diodes functioning as a rectifier.

The input terminal is connected to a power supply (not shown) such as a battery and an electric generator, where a power supply voltage is applied. The voltage applied to the input terminal is an input voltage.

A stepped-up/stepped-down input voltage is output from the output terminal as an output voltage.

The reactor L1A accumulates and discharges magnetic energy when an input voltage is stepped up and stepped down respectively. The reactor L1A is disposed between the transformer Tr1 and the positive electrode of the input terminals.

By switching on and off the first arm A1 and the second arm A2, the capacitors C1A and C2A repeatedly charge and discharge an electric charge. The capacitors C1A and C2A are constituted of, for example, a ceramic capacitor or a film capacitor in the embodiment.

The transformer Tr1 includes cores (iron core) about which a plurality of coils are wound. The three-parallel magnetic-field cancellation type transformer Tr1 is connected to the reactor L1A in the embodiment. According to the three-parallel magnetic-field cancellation type transformer, a piece of magnetic flux is generated from a plurality of coils wound and disposed in parallel with each other when the current flows through the plurality of coils. The direction of the magnetic flux is substantially opposite to each other, whereby counteracting each other (canceling each other out). According to the core of the transformer Tr1, a part where the coil is wound is called as a magnetic leg portion and another part where the coil is not wound is called as a base. Hereinafter, the transformer Tr1 will be described in detail with reference to FIGS. 2 to 3.

Figure 2:
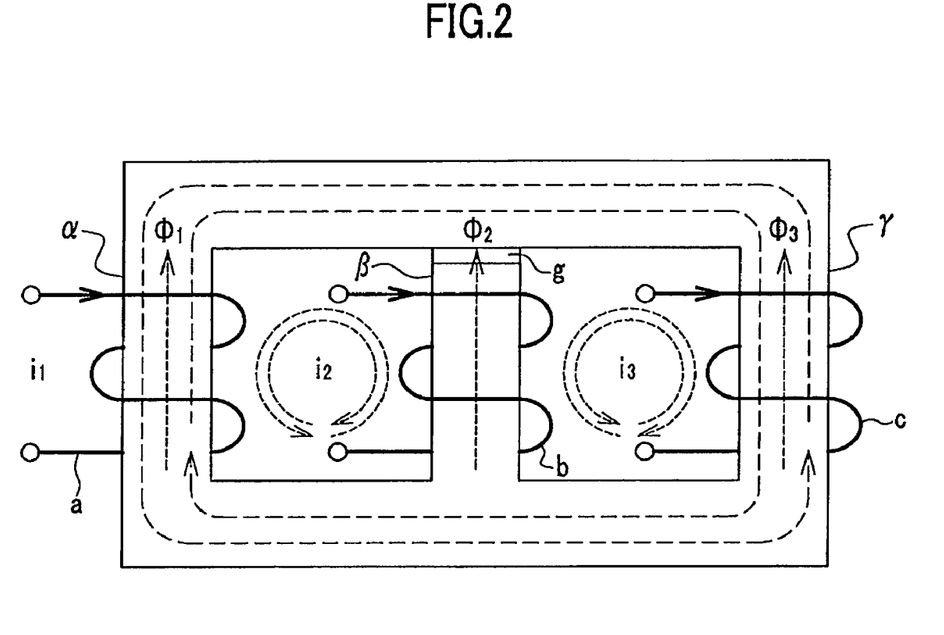
FIG. 2 is a perspective view of a transformer wherein coils are disposed in parallel, and the magnetic flux is shown in a dot line.
Figure 3A:
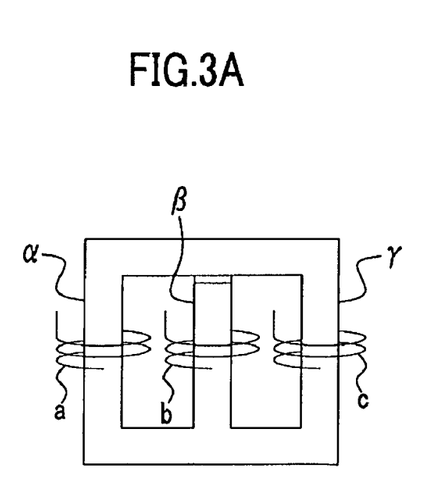
FIG. 3A is a perspective view of the transformer.
Figure 3B:
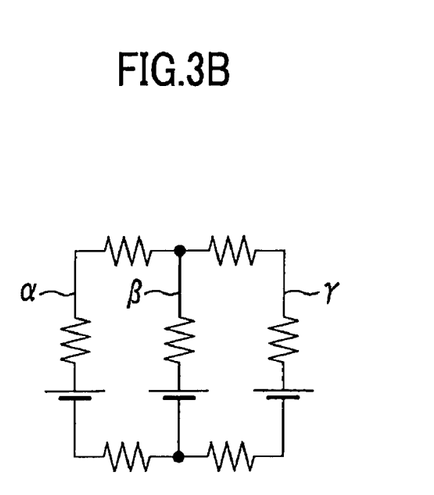
FIG. 3B is an equivalent circuit of the transformer.

As shown in FIG. 2, the transformer Tr1 includes three magnetic leg portions ($\alpha$, $\beta$, $\gamma$) where the coils (a, b, c) are wound respectively. When each current (i1, i2, i3) flows through coils (a, b, c), magnetic flux ($\Phi$, $\Phi 2$, $\Phi 3$) is generated respectively. In any couple selected from among of the pieces of the magnetic flux ($\Phi 1$, $\Phi 2$, $\Phi 3$) generated in the transformer Tr1, the direction of the magnetic flux is opposite to each other. More specifically, the direction of the magnetic flux ($\Phi 1$, $\Phi 2$) is opposite to each other. The direction of the magnetic flux ($\Phi 2$, $\Phi 3$) is opposite to each other. Further, the direction of the magnetic flux ($\Phi 1$, $\Phi 3$) is opposite to each other.

In FIG. 2, a closed magnetic circuit (loop) of the magnetic flux ($\Phi 1$, $\Phi 2$, $\Phi 3$) is shown in a dashed line. A pair of coils wound on the magnetic leg portions $\alpha$ and $\gamma$ generates a large closed magnetic circuit. Small closed magnetic circuits are generated from a pair of coils wound on the magnetic leg portions $\alpha$ and $\beta$ as well as a pair of coils wound on the magnetic leg portions $\beta$ and $\gamma$ when the current flows.

The transformer Tr1 has a gap g at the magnetic leg portion $\beta$. The gap g allows the magnitude of the magnetic flux to be adjusted, so that the magnetic flux $\Phi 1$ and $\Phi 2$ is cancelled out with each other, the magnetic flux $\Phi 2$ and $\Phi 3$ is cancelled out with each other, and the magnetic flux $\Phi 1$ and $\Phi 3$ is cancelled out with each other. The gap g may as well range approximately from several microns to several millimeters. An insulation sheet and the like can be interposed in the gap g. Cores of various shapes will be described later. The explanation of operation returns to FIG. 1.

The first arm A1 is constituted by three switching elements (switches SW1A, SW2A, and SW3A) and used for switching to step up an input voltage. According to the embodiment, the switching elements connected in parallel are constituted by switches including a flywheel diode. The switching elements may as well be semiconductor devices such as an insulated gate bipolar transistor (IGBT) and a metal oxide semiconductor field effect transistor (MOS-FET). When the switching elements are constituted of MOS-FETs, a parasitic diode of the MOS-FET may as well be used in place of the fly-wheel diode. Further, the flywheel diode may as well be connected in parallel with the MOS-FETs. When the electric power conversion circuit 1 is applied only for the voltage step-up operation, the second arm A2 which is not used for switching can be replaced with diodes.

The second arm A2 is constituted by three switching elements (switches SW5A, SW6A, and SW7A) and applied for switching when an input voltage is stepped down. According to the embodiment, the switching elements connected in parallel are constituted of switches including the flywheel diode. The switching elements may as well be semiconductor devices such as IGBTs and MOS-FETs. When the switching elements are constituted of MOS-FETs, a parasitic diode of the MOS-FET can be applied in place of the fly-wheel diode. Further, the flywheel diode may as well be connected in parallel with the MOS-FETs. When the electric power conversion circuit 1 is applied only for the voltage step-down operation, the second arm A1 which is not used for switching can be replaced with the diodes.

An electric power conversion circuit 1A shown in FIG. 1B includes a four-parallel magnetic-field cancellation type transformer Tr2, a first arm A3 and a second arm A4 which have four switching elements respectively. The transformer Tr2 is an alternating three-parallel magnetic-filed cancellation type transformer Tr1 of the electric power conversion circuit 1 shown in FIG. 1A. The first arm A3 and the second arm A4 are the alternate first arm A1 and the second arm A2 which include three switching elements. More specifically, each arm is constituted by switching elements whose number is equal to the number of coils disposed in parallel.

Figure 1C:
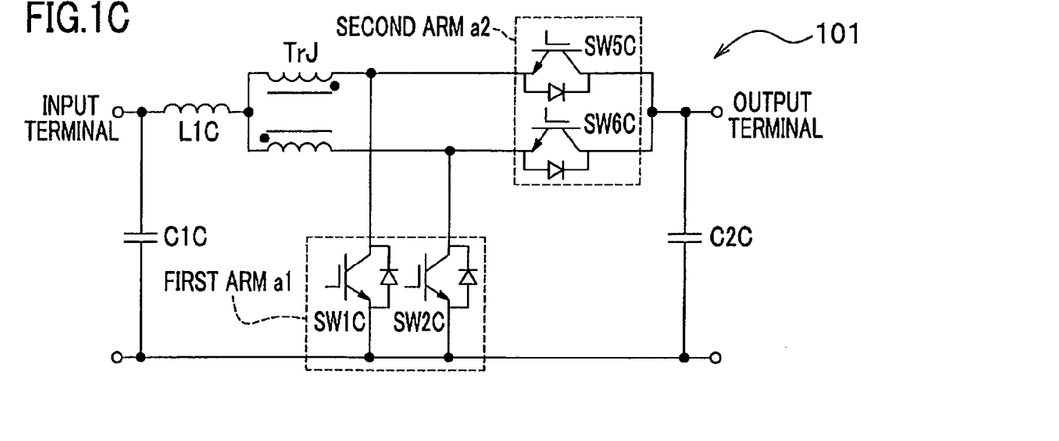
FIG. 1C is a circuit diagram of a conventional electric power conversion circuit.

Further, FIG. 1C shows an electric power conversion circuit 101 including the conventional two-parallel magnetic-field cancellation type transformer wherein a voltage applied to an input terminal is stepped up/down and supplied to an output terminal to be output. The electric power conversion circuit includes a reactor L1, capacitors C1C and C2C, a transformer TrJ (two-parallel magnetic-field cancellation type transformer), a first arm a1, and a second arm a2. The same elements are designated as the same references shown in FIG. 1A, and thereby duplicated descriptions are omitted.

The transformer TrJ (two-parallel magnetic-field cancellation type transformer) includes two coils, wherein the direction of the magnetic flux from the coils is opposite to each other.

The first arm a1 is constituted by two switching elements (switches SW1C and SW2C) and used for switching when an input voltage is stepped up. According to the embodiment, the switching elements connected in parallel are constituted of switches including a flywheel diode. The switching elements may as well be semiconductor devices such as IGBTs and MOS-FETs. When the electric power conversion circuit 101 is used only for the voltage step-up operation, the second arm a2 which is not used for switching can be replaced with diodes.

The second arm a2 is constituted by two switching elements (switches SW5C and SW6C) and used for switching to step down an input voltage. According to the embodiment, the switching elements connected in parallel are constituted by switches including the flywheel diode. The switching elements may as well be constituted by semiconductor devices such IGBTs and MOS-FETs. When the electric power conversion circuit 101 is applied only for the voltage step-down operation, the second arm a1 which is not used for switching can be replaced with diodes.

Figure 4:
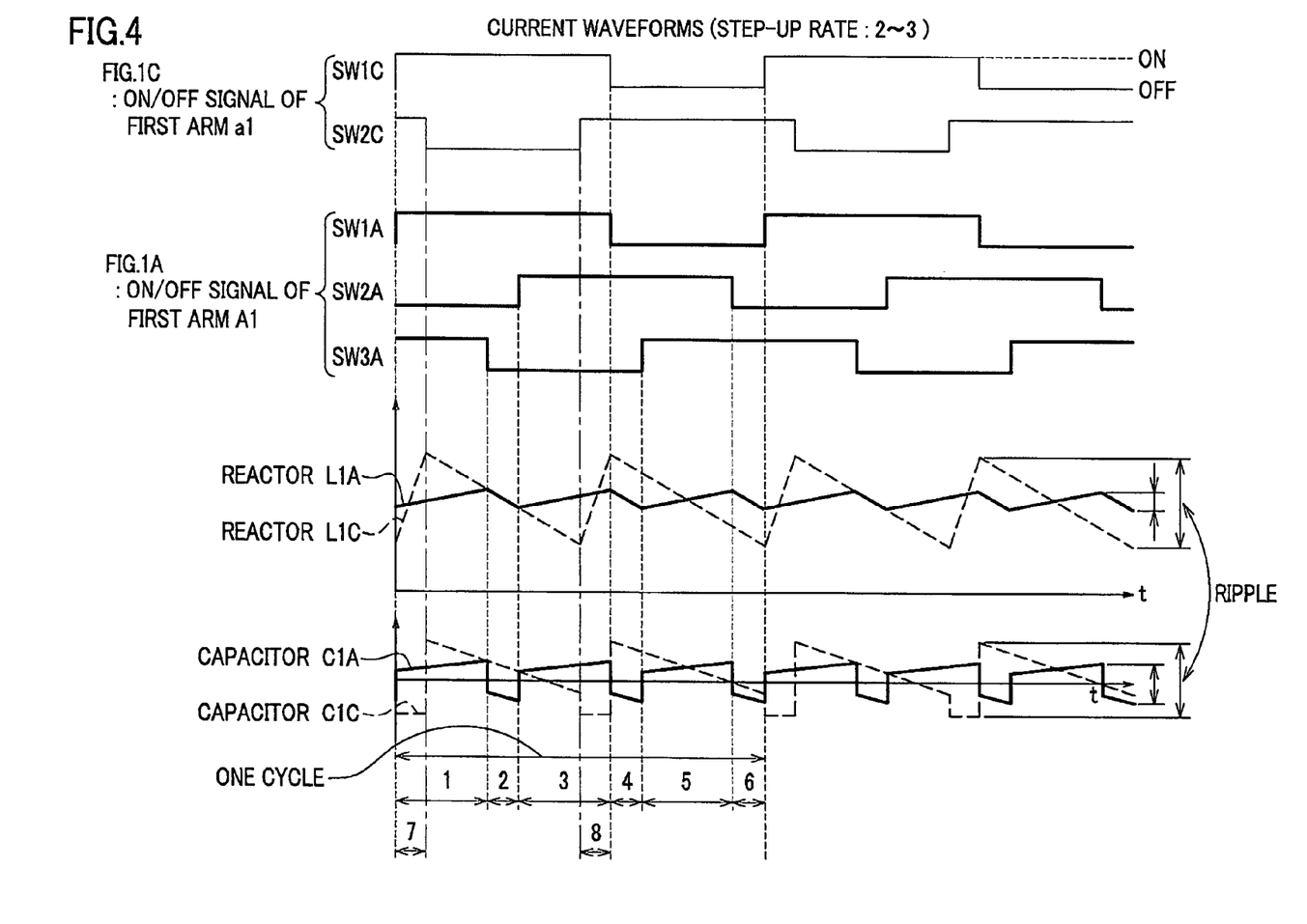
FIG. 4 is waveforms showing a gate signal of switching elements and current waveforms of the electric power conversion circuits of FIGS. 1A and 1C during voltage step-up operation.
Figure 5:
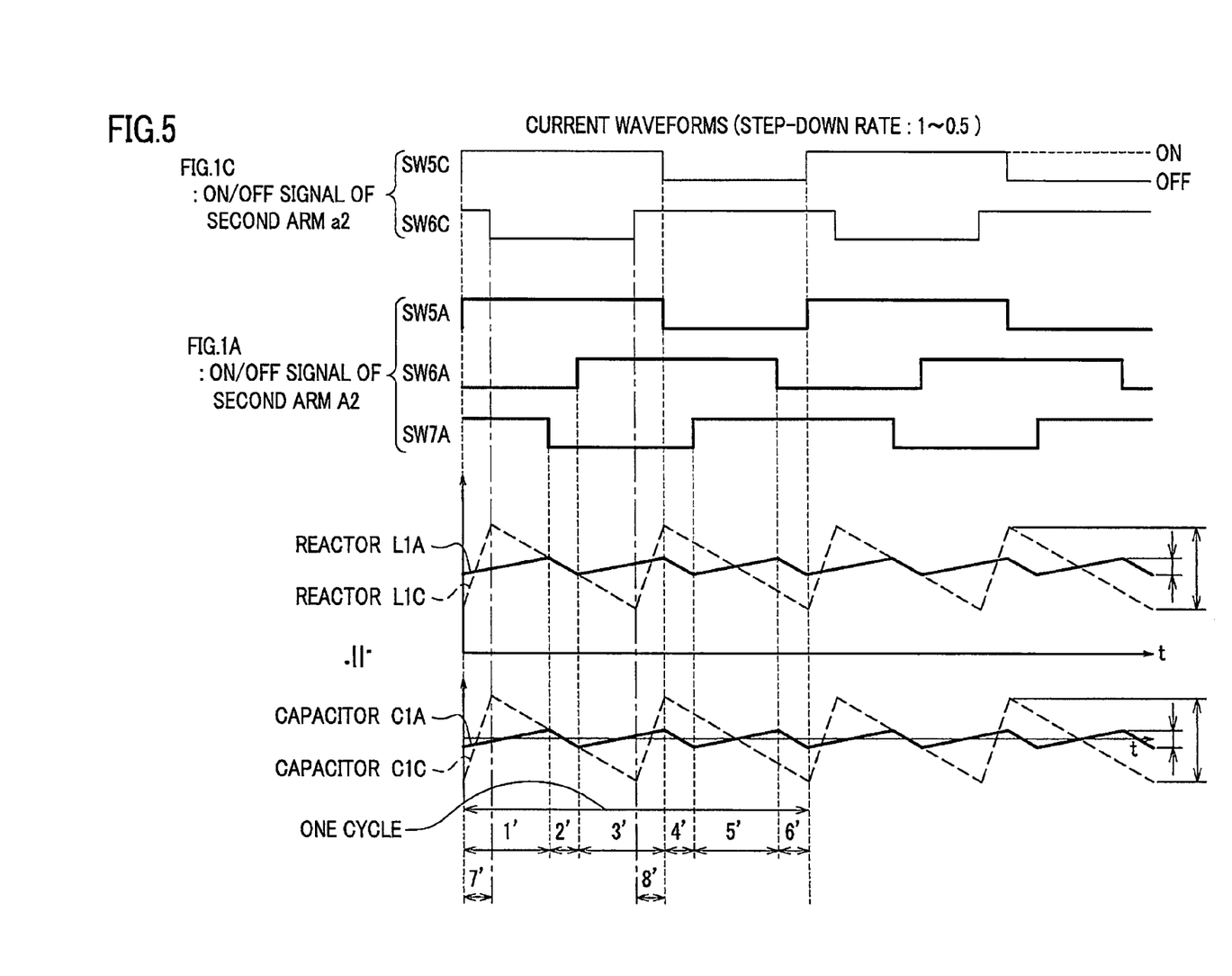
FIG. 5 is waveforms showing a gate signal of switching elements and current waveforms of the electric power conversion circuits of FIGS. 1A and 1C during voltage step-down operation.

The switching operation of the first arm A1 and the second arm A2 will be described with reference to FIGS. 4 and 5. The switching of the first arm A1 and the second arm A2 is performed by a duty control. In FIGS. 4 and 5, the switching of the first arm A1 and the second arm A2 will be described, compared with the switching of the first arm a1 and the second arm a2 of the electric power conversion circuit 101 including the conventional two-parallel magnetic-field cancellation type transformer shown in FIG. 1C. The switching of the first arm A3 and the second arm A4 is substantially the same as that of the first arm A1 and the second arm A2 shown in FIGS. 4 and 5. Accordingly, the duplicated descriptions are omitted.

At first, the switching of the first arm A1 in voltage step-up operation will be described with reference to FIG. 4. FIG. 4 shows waveforms of ON/OFF control signal for the first arm A1 constituted of the switches SW1A, SW2A, and SW3A of FIG. 1A, an electric current waveform (shown in a solid line) of the reactor L1A of FIG. 1, and an electric current waveform (shown in the solid line) of the capacitor C2A of FIG. 1 where voltage step-up operation is performed by the switching of the first arm A1. Further, FIG. 4 shows waveforms of ON/OFF control signal for the first arm a1 constituted by the switches SW1C and SW2C in FIG. 1C, an electric current waveform (shown in dotted line) of the reactor L1C in FIG. 1C, and an electric current waveform (shown in the dotted line) of the capacitor C2C in FIG. 1C where the voltage step-up operation is performed by the switching of the first arm a1.

In FIG. 4, one cycle is a period from ON state when the switch SW1A is switched on to OFF state when the switch SW1A is switched off. FIG. 4 shows a time period 7 from the time when the switch SW1C of the first arm a1 is switched on to the time when the switch SW2C of the first arm a1 is switched off (more specifically, period when both of the switches SW1C and SW2C of the first arm a1 are kept switching on). Further, FIG. 4 shows a time period 1 from the time when the switch SW1A of the first arm A1 is switched on to the time when the switch SW3A of the first arm A1 is switched off. Moreover, FIG. 4 shows a time period 2 from the time when the switch SW3A is switched off to the time when the switch SW2A is switched on.

Subsequently, FIG. 4 indicates a time period 3 from the time when the switch SW2A of the first arm A1 is switched on to the time when the switch SW1A of the first arm A1 is switched off. FIG. 4 shows a time period 8 from the time when the switch SW2C of the first arm a1 is switched on to the time when the switch SW1A of the first arm A1 and the switch SW1C of the first arm a1 are switched off (more specifically, during the period when the switches SW1A and SW1C are switched on). FIG. 4 shows a time period 4 from the time when both the switch SW1A of the first arm A1 and the switch SW1C of the first arm a1 are switched off to the time when the switch SW3A of the first arm A1 is switched on.

Further, FIG. 4 indicates a time period 5 from the time when the switch SW3A of the first arm A1 is switched on to the time when the switch SW2A of the first arm A1 is switched off. FIG. 4 shows a time period 6 from the time when the switch SW2A of the first arm A1 is switched off to the time when both the switch SW1A of the first arm A1 and the switch SW1C of the first arm a1 are switched on.

As shown in FIG. 4, the one cycle for switching the first arm A1 in the voltage step-up operation is divided into six periods from the time periods 1 to 6. The ripples (peak-to-peak) of the electric current waveforms of the reactor L1A and the capacitor C2A are reduced with respect to the switching of the first arm A1, compared with the switching of the conventional first arm a1. The frequency of the current flowing through the reactor L1A (or the capacitor C2A) can be raised by increasing the number of the switches disposed in parallel. Accordingly, the slope of the current flowing through the reactor L1A is reduced to a low gradient. In the embodiment, the frequency of the current can be 1.5 times greater, compared with the conventional circuit.

Next, the switching of the second arm A2 in voltage step-down operation will be described with reference to FIG. 5. FIG. 5 shows waveforms of ON/OFF control signal for the second arm A2 constituted by the switches SW5A, SW6A, and SW7A in FIG. 1A, an electric current waveform (shown in a solid line) of the reactor L1A in FIG. 1, and an electric current waveform (shown in the solid line) of the capacitor C2A in FIG. 1 where voltage step-down operation is performed by the switching of the second arm 2A. Further, FIG. 5 shows waveforms of ON/OFF control signal for the second arm a2 constituted by the switches SW5C and SW6C of FIG. 1C, an electric current waveform (shown in dotted line) of the reactor L1C in FIG. 1C, and an electric current waveform (shown in the dotted line) of the capacitor C2C in FIG. 1C where the voltage step-down operation is performed by the switching of the second arm a2.

In FIG. 5, one cycle of switching is a period from ON state when the switch SW5A is switched on to OFF state when the switch SW5A is switched off. FIG. 5 shows a time period 7' from the time when the switch SW5C of the second arm a2 is switched on to the time when the switch SW6C of the second arm a2 is switched off (more specifically, period when both the switches SW5C and SW6C of the second arm a2 are kept switching on). Further, FIG. 5 shows a time period 1' from the time when the switch SW5A of the second arm A2 is switched on to the time when the switch SW7A of the second arm A2 is switched off. Moreover, FIG. 5 shows a time period 2' from the time when the switch SW7A of the second arm A2 is switched off to the time when the switch SW6A of the second arm A2 is switched on.

Subsequently, FIG. 5 shows a time period 3' from the time when the switch SW6A of the second arm A2 is switched on to the time when the switch SW5A of the second arm A2 is switched off. FIG. 5 shows a time period 8' from the time when the switch SW6C of the second arm a2 is switched on to the time when both the switch SW5A of the second arm A2 and the switch SW5C of the second arm a2 are switched off (more specifically, during the period when the switches SW5A and SW5C are kept switching on). FIG. 5 shows a time period 4' from the time when both the switch SW5A of the second arm A2 and the switch SW5C of the second arm a2 are switched off to the time when the switch SW6A of the second arm A2 is switched on.

Further, FIG. 5 shows a time period 5' from the time when the switch SW7A of the second arm A2 is switched on to the time when the switch SW6A of the second arm A2 is switched off. FIG. 5 shows a time period 6' from the time when the switch SW6A of the second arm A2 is switched off to the time when both the switch SW5A of the second arm A2 and the switch SW5C of the second arm a2 are switched on.

As shown in FIG. 5, the one cycle for switching the second arm A2 in the voltage step-down operation is divided into six time periods from the time periods 1' to 6'. The ripples (peak-to-peak) of the current waveforms of the reactor L1A and the capacitor C2A are reduced with respect to the switching of the second arm A2, compared with the switching of the conventional second arm a2. The frequency of the current flowing through the reactor L1A (or the capacitor C2A) can be raised by increasing the number of the switches disposed in parallel. In the embodiment, the frequency of the current can be 1.5 times greater, compared with the conventional circuit.

In the periods 7 and 8 of the voltage step-up operation, the switches SW1C and SW2C are kept switching on. The switching of the switches SW1C and SW2C disposed in parallel allows an input voltage to be stepped up, whereby providing an output voltage two times higher than the input voltage. In the periods 7' and 8' of the voltage step-down operation, the switches SW5C and SW6C of the second arm a2 are kept switching on. The switching of the switches SW5C and SW6C disposed in parallel allows the input voltage to be stepped down, whereby providing an output voltage 0.5 to 1.0 times lower than the input voltage. However, since the impedance of the electric power conversion circuit 1 is low, a large amount of current flows through the inductor. Accordingly, the current ramps up in the periods, so that the ripple is outstandingly increased. In the periods of the voltage step-up operation, where the switching of three switches in parallel are simultaneously turned on, the three switches allows the input voltage to be stepped up, whereby providing an output voltage four times higher than the input voltage. However, as is the same case where the two switches disposed in parallel are applied in order to provide the voltage two times higher than the input voltage, the three switches disposed in parallel have the same problem as the increase of the ripple.

Preferably, the number of switches disposed in parallel should be changed in accordance with a desired voltage step-up rate with respect to the electric power conversion circuit 1.

Further, FIGS. 6 to 10 show operational comparison between the electric power conversion circuit 1 and the electric power conversion circuit 101, and between the three-parallel magnetic-field cancellation type transformer Tr1 (hereinafter, simply referred to as a three-parallel transformer) and the conventional two-parallel magnetic-field cancellation type transformer TrJ (hereinafter referred to as a two-parallel transformer), as well as the operational waveforms of the transformer Tr1

Figure 6:
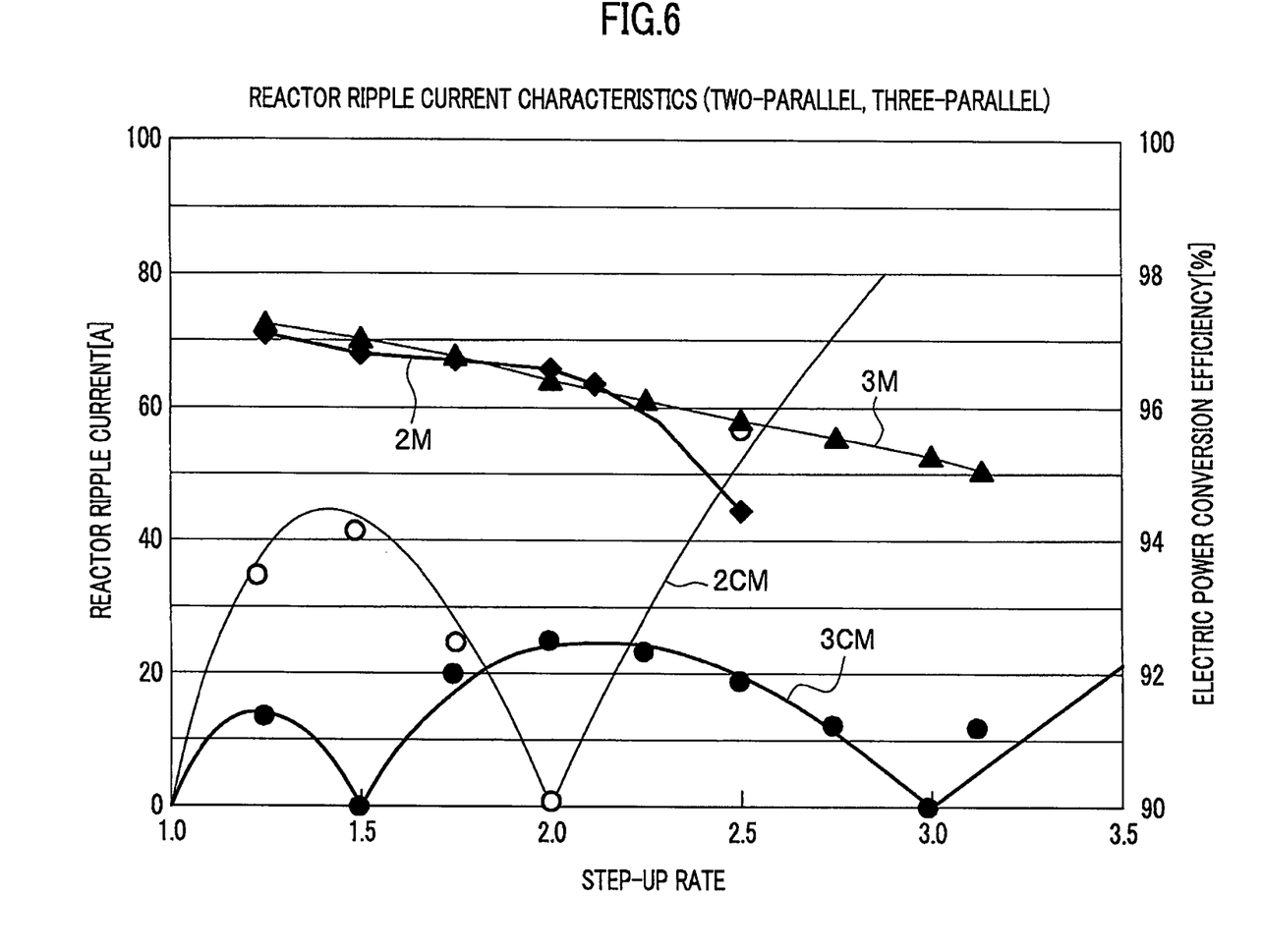
FIG. 6 is a graph showing a ripple current characteristic with respect to two-parallel and three-parallel magnetic-field cancellation type transformers during voltage step-up operation.
Figure 7:
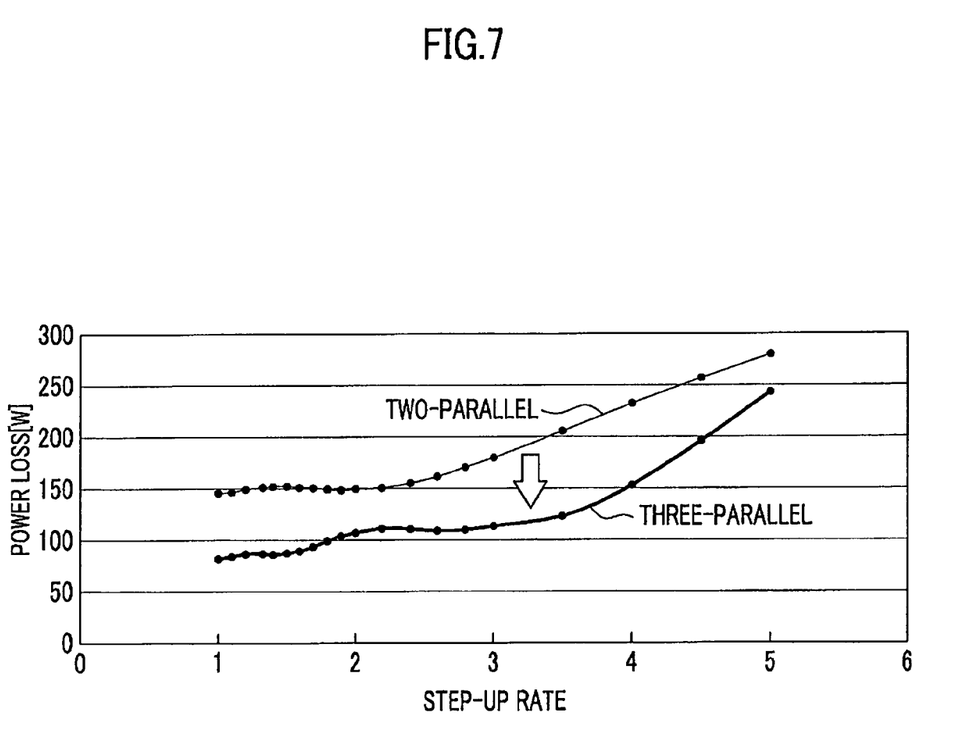
FIG. 7 is a graph showing power loss with respect to the two-parallel and three-parallel magnetic-field cancellation type transformers during voltage step-up operation.
Figure 8:
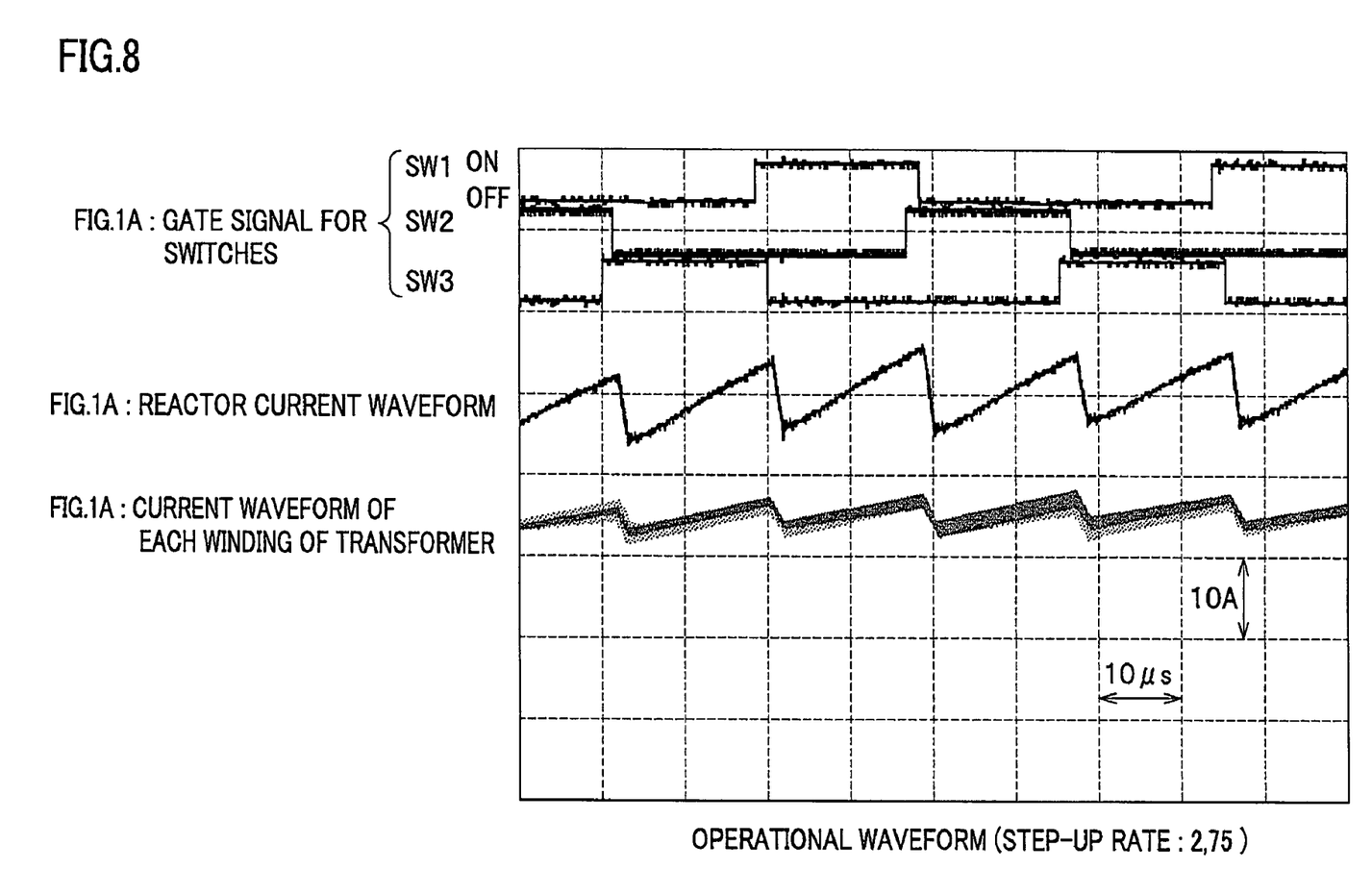
FIG. 8 is a graph showing actual operational waveforms of the three-parallel magnetic-field cancellation type transformer.

FIG. 6 shows the relationship of the voltage step-up rate to a ripple current of the reactor L1 and electric power conversion efficiency. FIG. 7 shows the relationship of the voltage step-up rate to the power loss of magnetic components (reactor and transformer). FIG. 8 is an actual operational waveforms of the transformer Tr1. FIG. 9 shows the embodiments of the transformer applied for the circuit including three switches disposed in parallel or four switches disposed in parallel. FIG. 10 shows a configuration view of the transformer applied to the circuit including two switches disposed in parallel.

As shown in FIG. 6, if the voltage step-up rate is two times with respect to the voltage step-up operation, the ripple current is reduced to 0 A in the circuit including two switches disposed in parallel. If the voltage step-up rate is greater than two times, a measured value 2MC of the ripple current is remarkably increased in the circuit. Further, if the voltage step-up rate exceeds two times, a measured efficiency 2M, which is an electric power conversion efficiency of the circuit including two switches disposed in parallel, significantly drops. On the other hand, if the voltage step-up rate is 1.5 and 3 times, a measured value 3CM of the ripple current is 0 A in the circuit including three switches disposed in parallel. Further, even if the voltage step-up rate exceeds 1.5 and 3 times, the measured value 3CM of the ripple current is not significantly increased in the circuit. If the voltage step-up rate exceeds two and three times, a measured efficiency 3M, which indicates the electric power conversion efficiency of the circuit including three switches disposed in parallel, does not drop significantly.

As shown in FIG. 7, a huge power loss W of magnetic components is generated in the circuit including two switches disposed in parallel during the voltage step-up operation. The power loss is due to a high amplitude of the ripple current in the circuit including two switches disposed in parallel, compared with the circuit including three switches disposed in parallel.

As shown in FIG. 8, when a slight variation is generated in the current flowing through each coil, the transformer Tr1 (three-parallel) can reduce the difference in direct current component of the current flowing through each coil by controlling the duty ratio of on-off period of the switches, whereby providing a stable voltage step-up operation. Accordingly, by reducing the difference in the direct current component of the stationary current flowing through the coils, the transformer Tr1 can cancel out the magnetic fields in the core. More specifically, by reducing the difference in the direct current component of the current flowing through the coils, the magnitude of magnetic flux generated from the coils can be equalized for cancellation. Consequently, the transformer Tr1 can prevent the magnetic saturation of the core.

To be specific, the transformer Tr1 effectively performs the cancellation of magnetic flux generated from the coils in which a direct current flows, and reduces the variation of the stationary current (the difference in the direct current component of the current flowing through each coil) by adjusting a winding ratio (preferably, turns ratio of each coil is 1:1), a length of magnetic path, and a cross section of the magnetic path. Accordingly, the transformer Tr1 can prevent the magnetic saturation and reduce the size thereof.

Further, various types of magnetic-field-cancellation-type transformers of a different shape (core shape) will be described with reference to FIGS. 9A to 9F, and 10.

FIGS. 9A to 9D show three-parallel magnetic-field cancellation type transformers Tr1 (transformers Tr1a, Tr1b, Tr1c, and Tr1d). FIGS. 9E and 9F show four-parallel magnetic-field cancellation type transformers Tr2 (transformers Tr2e and Tr2e). FIG. 10 shows a conventional two-parallel magnetic-field cancellation type transformer TrJ (transformer TrJ1).

Figure 9A:
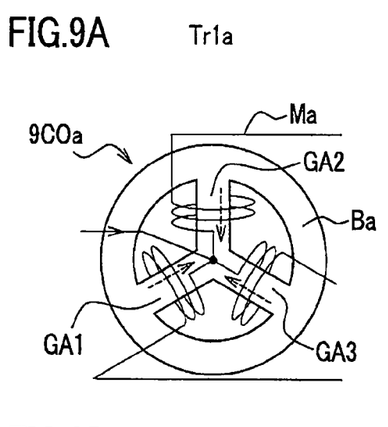
FIGS. 9A to 9D are schematic views of the three-parallel magnetic-field cancellation type transformers.
Figure 9B:
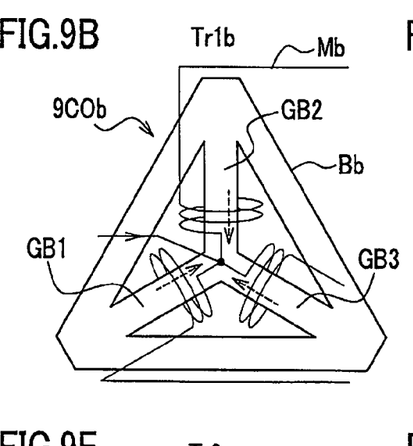
Figure 9C:
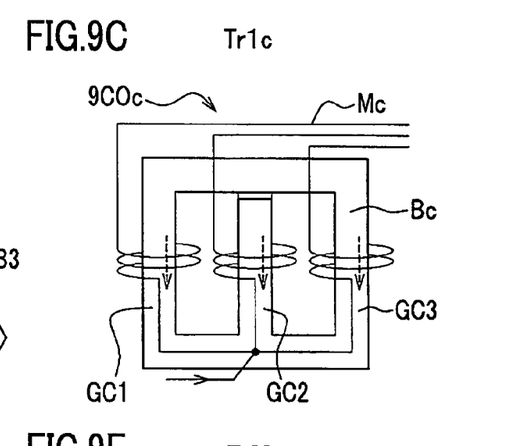
Figure 10:
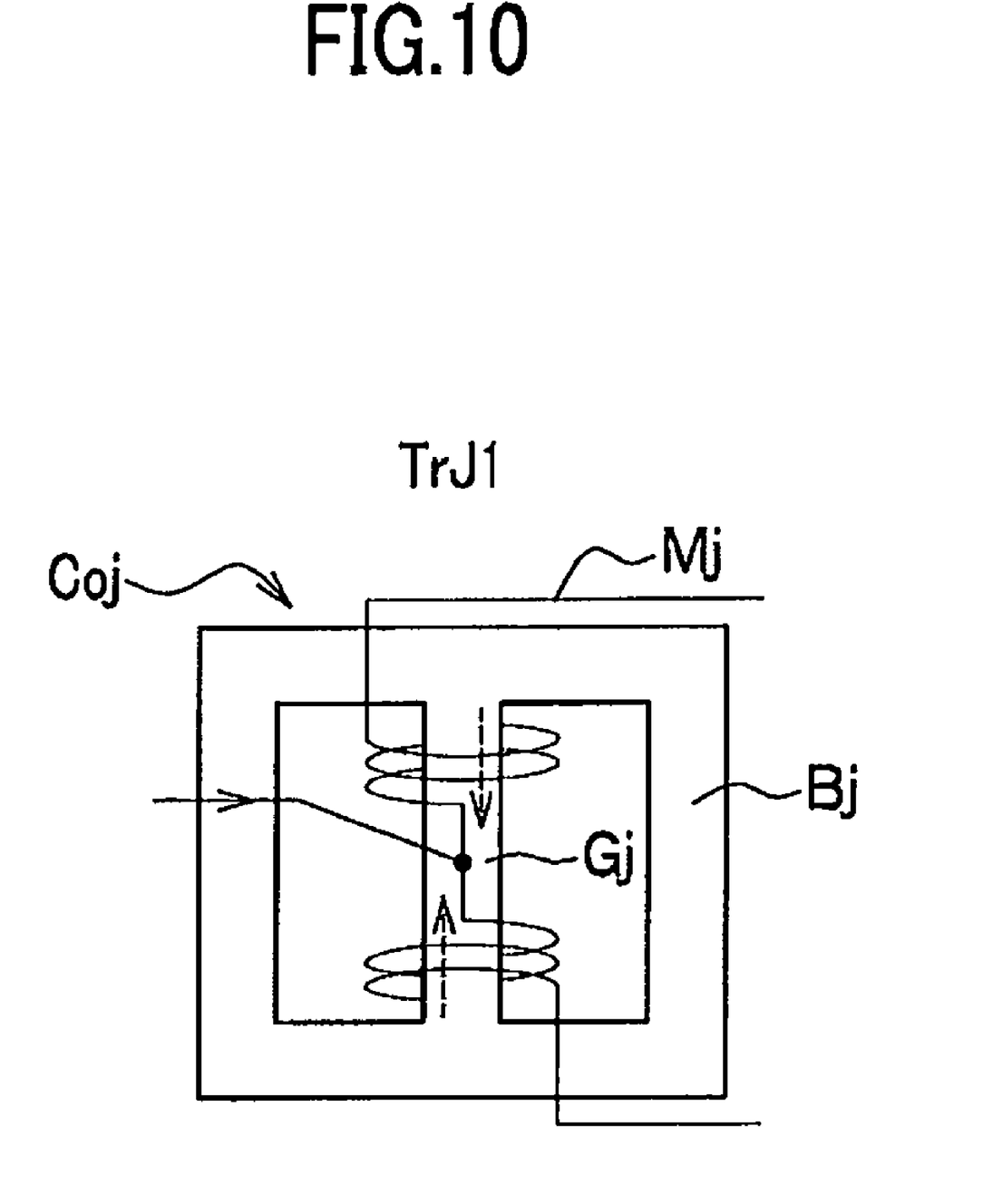
FIG. 10 is a schematic view of the two-parallel magnetic-field cancellation type transformer.

As shown in FIGS. 9A to 9C, three-parallel magnetic-field cancellation type transformers (Tr1a, Tr1b, Tr1c, and Tr1d) include a plurality of coils M which generate the magnetic flux during energization, and a core CO having three magnetic leg portions G (G1A, G2A, G3A, G1B, G2B, GB3, G1C, G2C, and G3C) where the coil M is wound, and bases B which fix the three magnetic leg portions.

The multi-parallel magnetic-field cancellation type transformer (three-parallel type) includes the plurality of coils wound on the magnetic leg portions G. Accordingly, the direction of the magnetic flux generated from the plurality of coils is opposite to each other. A plurality of closed-magnetic circuits of the magnetic flux are formed at the magnetic leg portions G and the bases B. At least, a magnetic resistance of the minimum closed magnetic circuit (loop) out of the plurality of closed magnetic circuits is homogeneous. The multi-parallel magnetic-field cancellation type transformer (three-parallel type) includes the plurality of coils M connected in parallel which generate the magnetic flux during energization, so that the magnetic path length of the closed magnetic circuit is homogeneous.

The multi-parallel magnetic-field cancellation type transformer (the three-parallel and four-parallel types) is constructed to equalize the magnetic path length in order to obtain the homogeneous magnetic resistance of the closed magnetic circuits, whereby balancing the magnetic flux density distribution and preventing the magnetic saturation. In this case, the magnetic resistance Rm is calculated as follows; Rm=1/μ·L/A (magnetic permeability: μ, length of magnetic path: L, cross section of magnetic path: A). If the product of the magnetic permeability and the cross section of magnetic path is constant in the formula described above, the homogeneous magnetic resistance can be obtained in accordance with the equal length of magnetic path.

FIG. 9A shows the three-parallel magnetic-field cancellation type transformer (transformer Tr1a) in which a base Ba of a core 9COa is formed in a circular shape. Magnetic leg portions GA1, GA2, and GA3 are extended from the center of the circular base to the circumference and disposed at regular intervals apart on the circumference.

FIG. 9B shows the three-parallel magnetic-field cancellation type transformer (transformer Tr1b), in which a base Bb of a core 9COb is formed in a regular polygonal shape (in the embodiment, in a regular triangle). Magnetic leg portions GB1, GB2 and GB3 are extended from the center of the regular polygon to the sides (apexes) and disposed at regular intervals apart on the sides.

FIG. 9C shows the three-parallel magnetic-field cancellation type transformer (transformer Tr1c), in which there is a gap GP formed at a magnetic leg portion GC2 which is the center between three magnetic leg portions.

Figure 9D:
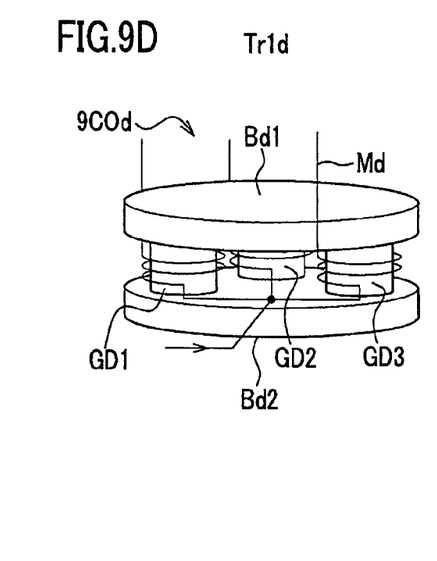
Figures 9E, 9F:
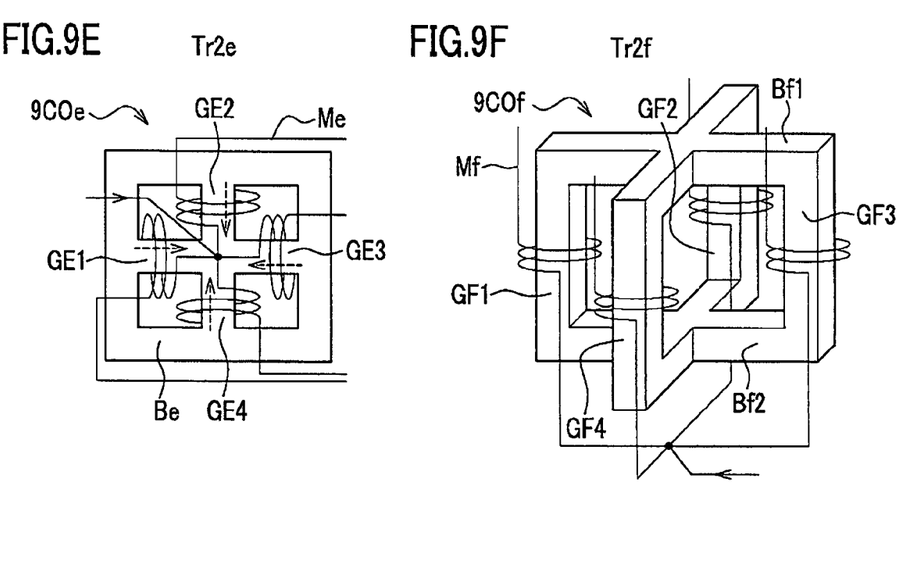
FIGS. 9E and 9F are schematic views of the four-parallel magnetic-field cancellation type transformers.

FIG. 9D shows the three-parallel magnetic-field cancellation type transformer (transformer Tr1d) in which bases Bd1 and Bd2 of a core 9COd are formed in a circular shape (or a regular triangle) and disposed in parallel with each other. Three magnetic leg portions GD1, GD2, and GD3 formed in a cylindrical shape are formed vertically to the bases Bd1 and Bd2 and disposed between the bases Bd1 and Bd2. The three magnetic leg portions GD1, GD2, and GD3 are disposed at regular intervals apart.

Further, FIG. 9E shows the four-parallel magnetic-field cancellation type transformer (transformer Tr2e) which includes a plurality of coils M which generate magnetic flux which being energized, and a core 9COe having four magnetic leg portions GE1, GE2, GE3, and GE4 on which the plurality of coils M are wound respectively, and a base Be for fixing the four magnetic leg portions. Further, the base Be of the core 9COe is formed in a regular polygon (in the embodiment in a regular square). The four magnetic leg portions GE1, GE2, GE3, and GE4 are extended from the center of the regular polygon to the sides (apexes) and fixed at regular intervals apart on the sides.

FIG. 9F shows a four-parallel magnetic-field cancellation type transformer (transformer Tr2f) in which bases Bf1 and Bf2 of a core 9COf are formed on two planes which are disposed in parallel with each other. Four magnetic leg portions GF1, GF2, GF3, and GF4 are disposed vertically to the planes and formed in a cylindrical shape. Further, the four magnetic leg portions GF1, GF2, GF3, and GF4 are disposed at regular intervals apart. On one plane, the base Bf1 is constituted by only a part where one ends of four magnetic leg portions are mutually joined, and on the other plane, the base Bf2 is constituted by only a part where the other ends of the four magnetic leg portions are mutually joined.

FIG. 10 shows a conventional multi-parallel magnetic-field cancellation type transformer TrJ1 which includes two coils Mj which generate magnetic flux which being energized, and a core COj having a magnetic leg portion Gj on which the two coils Mj are wound, and a base Bj for fixing the magnetic leg portion Gj. The two coils wound on the magnetic leg portion Gj are disposed in such a manner that the direction of the magnetic flux generated from the two coils is opposite to each other. The multi-parallel magnetic-field cancellation type transformer generates a plurality of closed magnetic circuits of the magnetic flux at the magnetic leg portion Gj and the base Bj. Accordingly, a magnetic resistance of the closed magnetic circuits is homogeneous.

The transformers Tr1 and Tr2 can adjust the amount of magnetic flux generated in the closed magnetic circuit, so that the transformers can cancel out the direct current magnetic flux generated from each coil at the electric power conversion. Accordingly, if the number of the coils disposed in parallel increases, the transformers can prevent magnetic saturation of the core, and reduce the size thereof and a core loss. Further, according to the transformers Tr1 and Tr2, since the coils M are connected in parallel, the thickness of the coils M can be reduced, whereby improving the latitude of design of the coils and space efficiency.

Since the magnetic leg portions GA1, GA2 and GA3 of the transformer Tr1a are connected to the circular base Ba and disposed at regular intervals apart on the circumference, the magnetic path length of each closed magnetic circuit can be homogeneous, which makes magnetic resistance constant. Consequently, the transformer Tr1a can cancel out direct current magnetic flux generated from each coil M at the electric power conversion. Even if the coils disposed in parallel increase in number, the transformer Tr1a can prevent the magnetic saturation of the core and reduce the core loss therein. According to the transformer Tr1b, since the magnetic leg portions GB1, GB2, and GB3 are connected to the base Bb formed in a regular polygonal shape and disposed at regular intervals on the sides of the base, the magnetic path length of each closed magnetic circuit can be homogeneous, which makes magnetic resistance constant. Consequently, the transformer Tr1b can cancel out direct current magnetic flux generated from each coil M at the electric power conversion. Even if the coils disposed in parallel increase in number, the transformer Tr1b can prevent the magnetic saturation of the core and reduce the core loss therein.

In any one of the combinations of the magnetic flux (Φ1, Φ2, Φ3) generated from the coils wound on the three magnetic leg portions GC1, GC2, and GC3, the direction of the magnetic flux in the transformer Tr1c is opposite to each other to be cancelled out. Since there is the gap GP formed at the magnetic leg portion GC2 which is the center between three magnetic leg portions, so that the magnitude of magnetic flux can be adjusted so as to make magnetic resistance constant. Consequently, the transformer Tr1c can cancel out direct current magnetic flux generated from each coil M at the electric power conversion. Even if the coils connected in parallel increase in number, the transformer Tr1c can prevent the magnetic saturation of the core and reduce the core loss therein.

Since the two bases Bd1 and Bd2 are respectively formed on two planes disposed in parallel with each other, and three magnetic leg portions GD1, GD2, and GD3 formed in a cylindrical shape are vertically disposed between the bases Bd1 and Bd2, the magnetic path length of each closed magnetic circuit can be homogeneous, which makes magnetic resistance constant. Consequently, the transformer Tr1d can cancel out direct current magnetic flux generated from each coil M at the electric power conversion. Even if the number of the coils disposed in parallel increases, the transformer Tr1d can prevent the magnetic saturation of the core and reduce the core loss therein.

On one plane of the transformer Tr2e, the base Bf1 of the core 9COf is constituted by only a part where one ends of four magnetic leg portions are mutually joined, and on the other plane, the base Bf2 of the core 9COf is constituted by only a part where the other ends of the four magnetic leg portions are mutually joined. Accordingly, the transformer Tr2e can provide a lightweight core, compared with the base having a flat plane.

In view of the electric power conversion circuit including the transformer Tr1 or Tr2, the first arm A1(A3) and the second arm A2 (A4) can control energization timing for the inductor L1A and the transformer Tr1 (Tr2) of multi-parallel magnetic-field cancellation type, and a current flow in the electric power conversion circuit, so that the multi-parallel magnetic-field cancellation type transformer can transform (step up/down) a voltage and convert electric power. Even if the number of the coils increases, the multi-parallel magnetic-field cancellation type transformer Tr1 (Tr2) can prevent the magnetic saturation of the core and reduce the weight thereof and the core loss. Consequently, the electric power conversion circuit 1 can reduce the weight thereof and provide a high conversion efficiency.

The embodiments of the present invention are not limited but can be modified. For example, in the embodiments, the multi-parallel magnetic-field cancellation type transformer Tr1b is formed in a square triangle. However, other regular polygon (regular pentagon, regular hexagon) can be applied. In the embodiments, the inductor is connected to the positive electrode of the input/output terminal of the electric power conversion circuit 1. However, the connecting point is not limited. The inductor can be connected to the negative electrode of the input/output terminal of the electric power conversion circuit 1.

We claim:

1. A multi-parallel magnetic-field cancellation type transformer for a multi-parallel direct current converter, comprising:
   at least three coils connected in parallel, each of which generates magnetic flux when energized; and
   a core comprising
      at least three magnetic leg portions about which the coils are wound; and
      a base for fixing the plurality of the magnetic leg portions, wherein
   the direction of magnetic flux generated from the at least three coils is opposite to each other in any couple selected from among the pieces of the magnetic flux, so that the magnetic flux is cancelled out with each other, and wherein
   at least three closed magnetic circuits of the magnetic flux are formed in the magnetic leg portions and the base, and a magnetic resistance of at least a smallest closed magnetic circuit from among the plurality of closed magnetic circuits is homogeneous.

2. The multi-parallel magnetic-field cancellation type transformer according to claim 1, wherein the plurality of coils generating the closed magnetic circuits are connected in parallel with each other.

3. The multi-parallel magnetic-field cancellation type transformer according to claim 1, wherein the magnetic path length of the closed magnetic circuits is homogeneous.

4. The multi-parallel magnetic-field cancellation type transformer according to claim 1, wherein the base of the core is formed in a flat circular shape, and the magnetic leg portions of the core are extended from the center of the base to the circumference and disposed at regular intervals on the circumference.

5. The multi-parallel magnetic-field cancellation type transformer according to claim 1, wherein the base of the core is formed in a regular polygonal shape, and the magnetic leg portions of the core are extended from the center of the core to the sides and disposed at regular intervals on the sides.

6. The multi-parallel magnetic-field cancellation type transformer according to claim 1, wherein two bases of the core are formed in a flat circular shape and disposed in parallel with each other, and wherein the plurality of magnetic leg portions of the core are formed in a cylindrical shape and disposed vertically to the two bases and at regular intervals apart.

7. The multi-parallel magnetic-field cancellation type transformer according to claim 1, wherein two bases of the core are formed in a regular triangle and disposed in parallel with each other, and wherein the plurality of magnetic leg portions of the core are formed in a cylindrical shape and disposed vertically to the two bases and at regular intervals apart.

8. The multi-parallel magnetic-field cancellation type transformer according to claim 1, wherein two bases of the core are respectively formed on a plane and disposed in parallel with each other, and the plurality of magnetic leg portions of the core are formed in a cylindrical shape and disposed vertically to the planes and at regular intervals apart, and wherein, on one plane, the base is constituted by only a part where one ends of the magnetic leg portions are mutually joined, and on the other plane, the base is constituted by only a part where the other ends of the magnetic leg portions are mutually joined.

9. A multi-parallel magnetic-field cancellation type transformer comprising:
   a plurality of coils, each of which generates magnetic flux when energized; and
   a core comprising:
      three magnetic leg portions about which the coils are wound; and
      a base for fixing the three magnetic leg portions, wherein
   the three magnetic leg portions are disposed at regular intervals in one direction, and the direction of the magnetic flux generated from the plurality of coils wound on the three magnetic leg portions is opposite to each other in any couple selected from among the pieces of magnetic flux, so that the magnetic flux is cancelled out with each other, and there is a gap at the magnetic leg portion formed at the center between the three magnetic leg portions, and wherein
   a plurality of closed magnetic circuits of the magnetic flux are formed in the magnetic leg portions and the bases, and a magnetic resistance of at least a smallest closed magnetic circuit from among the plurality of closed magnetic circuits is homogeneous.

* * * * *